US011106642B2

(12) United States Patent
Wada et al.

(10) Patent No.: US 11,106,642 B2
(45) Date of Patent: Aug. 31, 2021

(54) CATALOGING DATABASE METADATA USING A PROBABILISTIC SIGNATURE MATCHING PROCESS

(71) Applicant: Io-Tahoe LLC., New York, NY (US)

(72) Inventors: Tomoya Wada, New York, NY (US); Winnie Cheng, West New York, NJ (US); Rohit Mahajan, Iselin, NJ (US); Alex Mylnikov, Edison, NJ (US)

(73) Assignee: Io-Tahoe LLC., New York, NY (US)

( * ) Notice: Subject to any disclaimer, the term of this patent is extended or adjusted under 35 U.S.C. 154(b) by 183 days.

(21) Appl. No.: 16/232,568

(22) Filed: Dec. 26, 2018

(65) Prior Publication Data

US 2020/0210388 A1 Jul. 2, 2020

(51) Int. Cl.
| | |
|---|---|
| *G06F 17/00* | (2019.01) |
| *G06F 16/21* | (2019.01) |
| *G06F 16/25* | (2019.01) |
| *G06F 16/22* | (2019.01) |
| *G06F 16/903* | (2019.01) |
| *G06F 16/9032* | (2019.01) |
| *G06F 16/908* | (2019.01) |
| *G06F 16/2455* | (2019.01) |
| *G06K 9/62* | (2006.01) |
| *G06F 40/242* | (2020.01) |
| *G06N 5/02* | (2006.01) |

(52) U.S. Cl.
CPC ......... *G06F 16/213* (2019.01); *G06F 16/221* (2019.01); *G06F 16/2456* (2019.01); *G06F 16/25* (2019.01); *G06F 16/908* (2019.01); *G06F 16/90332* (2019.01); *G06F 16/90344* (2019.01); *G06F 40/242* (2020.01); *G06K 9/6215* (2013.01); *G06N 5/02* (2013.01)

(58) Field of Classification Search
CPC ...... G06F 16/213; G06F 40/242; G06F 16/25; G06F 16/221; G06F 16/90344; G06F 16/90332; G06F 16/908; G06F 16/2456; G06K 9/6215; G06N 5/02
See application file for complete search history.

(56) References Cited

U.S. PATENT DOCUMENTS

| | | |
|---|---|---|
| 5,442,780 A | 8/1995 | Takanashi et al. |
| 5,615,341 A | 3/1997 | Agrawal et al. |
| 2002/0152202 A1 | 10/2002 | Perro et al. |

(Continued)

OTHER PUBLICATIONS

The International Search Report and The Written Opinion of the International Searching Authority for PCT/US2019/057002, dated Feb. 13, 2020, ISA/RU, Moscow, Russia.

(Continued)

*Primary Examiner* — Syed H Hasan
(74) *Attorney, Agent, or Firm* — M&B IP Analysts, LLC

(57) ABSTRACT

A system and computer implemented method for cataloging database metadata using a probabilistic signature matching process are provided. The method includes receiving an input name to be matched to keys in a data corpus; dividing the received input name into a plurality of text segments; identifying a set of matching keys by matching each of the plurality text segments against keys in the data corpus; analyzing the set of matching keys to construct a tag; and cataloging the metadata with the matching key as the construct tag.

19 Claims, 6 Drawing Sheets

(56) References Cited

U.S. PATENT DOCUMENTS

| | | | |
|---|---|---|---|
| 2004/0073447 A1* | 4/2004 | Stuart | G06Q 10/02 705/307 |
| 2005/0055369 A1* | 3/2005 | Gorelik | G06F 16/24544 |
| 2007/0156790 A1 | 7/2007 | Hsu et al. | |
| 2008/0033940 A1* | 2/2008 | Dinh | G06F 16/2423 |
| 2009/0012991 A1 | 1/2009 | Johnson et al. | |
| 2009/0144609 A1 | 6/2009 | Liang et al. | |
| 2010/0250598 A1 | 9/2010 | Brauer et al. | |
| 2011/0145254 A1 | 6/2011 | Pragada et al. | |
| 2012/0036149 A1* | 2/2012 | Tsuboi | G06F 16/338 707/769 |
| 2012/0254143 A1* | 10/2012 | Varma | G06F 40/30 707/706 |
| 2013/0297661 A1* | 11/2013 | Jagota | G06F 40/216 707/822 |
| 2014/0337257 A1 | 11/2014 | Chatterjee et al. | |
| 2015/0254255 A1* | 9/2015 | Trivedi | G06F 16/221 707/723 |
| 2015/0356094 A1 | 12/2015 | Gorelik | |
| 2016/0162557 A1 | 6/2016 | Delgobbo et al. | |
| 2016/0225054 A1 | 8/2016 | Johnson et al. | |
| 2016/0342597 A1 | 11/2016 | Azzam et al. | |
| 2017/0011029 A1 | 1/2017 | Chatterjee et al. | |
| 2017/0116295 A1* | 4/2017 | Wan | G06F 16/254 |
| 2017/0161262 A1 | 6/2017 | Bhatt et al. | |
| 2018/0018579 A1* | 1/2018 | Xu | G06N 20/00 |
| 2018/0080784 A1 | 3/2018 | Narasimhan et al. | |
| 2020/0081899 A1* | 3/2020 | Shapur | G06F 16/2237 |

OTHER PUBLICATIONS

Mohamed, et al., "A Probabilistic Analysis of Some Tree Algorithms", The Annals of Applied Probability, vol. 15, No. 4, France, 2005.

Word Segmentation, or Makingsenseofthis, A First Look at Google's N-Gram Corpus, originally posted in 2012, accessed Oct. 25, 2018, url: https://jeremykun.com/2012/01/15/word-segmentation/.

* cited by examiner

CATALOGING DATABASE METADATA USING A PROBABILISTIC SIGNATURE MATCHING PROCESS

TECHNICAL FIELD

The present disclosure relates generally to systems using database systems, and more specifically to a signature-based matching process of database properties in data sources.

BACKGROUND

A database catalog of a database in a data source instance includes metadata in which definitions of database objects such as tables, views (virtual tables), synonyms, value ranges, indexes, users, and user groups are stored. For example, in relational databases, the database catalog is defined as the information schema (information_schema) is an ANSI-standard set of read-only views which provide information about all of the tables, views, columns, and procedures in a database in the data source.

The database catalog is defined by a programmer or database administrator (DBA) of the database. As such, the naming of various properties of the database may be assigned with or without context to the actual content. For example, a column in a database can be named as "CODE_A3". Such naming is out of context, as the database can hold information about an error code or a country code. Thus, the column's name may not be indicative of content (data) maintained by the column.

As programmers should follow standard specifications about the syntax of the database, they are not required to follow certain rules with respect to the semantics of the database catalog. For example, for a column in a database involved in a data source maintaining country code, one programmer can name this column as "CODE_A3", while another can name this column as "CODE_CR".

The lack of an appropriate syntax in code and/or one conventional naming notation may lead, for example, to errors in retrieving data, thus downgrading the performance of applications relying on data stored in the database. The errors in retrieving data are due to human errors in typing queries or mismatching column names.

This is the particular case where a data source includes multiple-database architecture, where different databases across data sources can be accessed by a single application. Each database can be defined by its own database catalog. That is, each database can be configured with its own tables and columns, where each column's naming may be independent of the others. For example, Table 1 residing in one database and Table 2 residing in another database may be defined as follows:

TABLE 1

| CODE_A3 | CURR_A3 |
| --- | --- |

TABLE 2

| CONT_CODE | CURR_CODE |
| --- | --- |

In the above example, both columns "CODE_A3" and "CONT_CODE" maintain country codes (e.g., USA, GBR, or JPN) and both columns "CURR_A3" and "CURR_CODE" maintain currency codes. As demonstrated in the above example, although both tables contain the same distinct values, their columns' names do not indicate as such.

One of the problems resulting from utilizing two tables, having inconsistent columns' names, is that the tables cannot be merged without manually modifying the columns' names to be consistent. That is, without unifying the columns' names, a SQL joint operation would fail. Single typing error in queries (i.e., error in syntax) leads to failure in SQL operation as well. To avoid such error, a complex query (e.g., query including regular expressions) may be needed. In a typical database deployment in a data source where there are hundreds of tables and thousands of columns, manually determining the context of each column and trying to identify corresponding columns is not feasible.

In order to address this problem, machine learning based solutions have been utilized to discover or tag columns' names. Such existing solutions require methods of digesting raw data (i.e., processing the raw data and generating a training dataset) and inputting the reference data (i.e., training dataset) into a machine learning model.

One of the deficiencies of machine learning based solutions is a strong dependency on the training dataset used. The training dataset can be generated from a single "domain" of the data resource, for example, financial or medical related data resources. Such datasets can be used to build and train machine learning models used to tag columns' names. Although the trained models can be used to tag column's names for a dataset from similar data resources, they may not perform for ones from different resources. There is no training for multiple data domains (i.e., across different data resources) on the same dataset, for example, financial data and medical data. As such, the trained dataset would be limited on a single domain and would not include aggregated financial and medical data.

Other deficiencies of machine learning based solutions are that there is not enough data resources available organization internally and/or publicly to train the machine learning models. For example, confidential data resources cannot be used for the training machine learning models, and feedback from the user may not be incorporated. As such, existing solutions cannot provide accurate tagging of columns' names in a multiple-database architecture in data sources.

Another widely used technique discussed in the related art which may be utilized allowing mapping between different columns, is the extract, transform, load (ETL) process. Data extraction is where data is extracted from homogeneous or heterogeneous data sources. Data transformation is where the data is transformed for storing in the proper format or structure for the purposes of querying and analysis. Data loading is where the data is loaded into the final target database, more specifically, an operational data store, data mart, or data warehouse.

An ETL process cannot uniquely tag columns' names, and therefore cannot provide accurate merging to their respective tables. For example, one ETL process may produce "cust_id" for a column name in a first database, and another ETL process may output "customer_id" for a column name in a second database. As such, the tables from the first and second databases cannot be merged using a conventional SQL query. The deviation in column names, for example, hampers merging not only databases within a single data source, but also databases across multiple data sources.

It would, therefore, be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a computer implemented method for cataloging database metadata using a probabilistic signature matching process. The method comprises receiving an input name to be matched to keys in a data corpus; dividing the received input name into a plurality of text segments; identifying a set of matching keys by matching each of the plurality text segments against keys in the data corpus; analyzing the set of matching keys to construct a tag; and cataloging the metadata with the constructed tag.

Certain embodiments disclosed herein also include a system for cataloging database metadata using a probabilistic signature matching process. The system comprises a processing circuitry; and a memory, the memory containing instructions that, when executed by the processing circuitry, configure the system to: receive an input name to be matched to keys in a data corpus; divide the received input name into a plurality of text segments; identify a set of matching keys by matching each of the plurality text segments against keys in the data corpus; analyze the set of matching keys to construct a tag; and catalog the metadata with the constructed tag.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
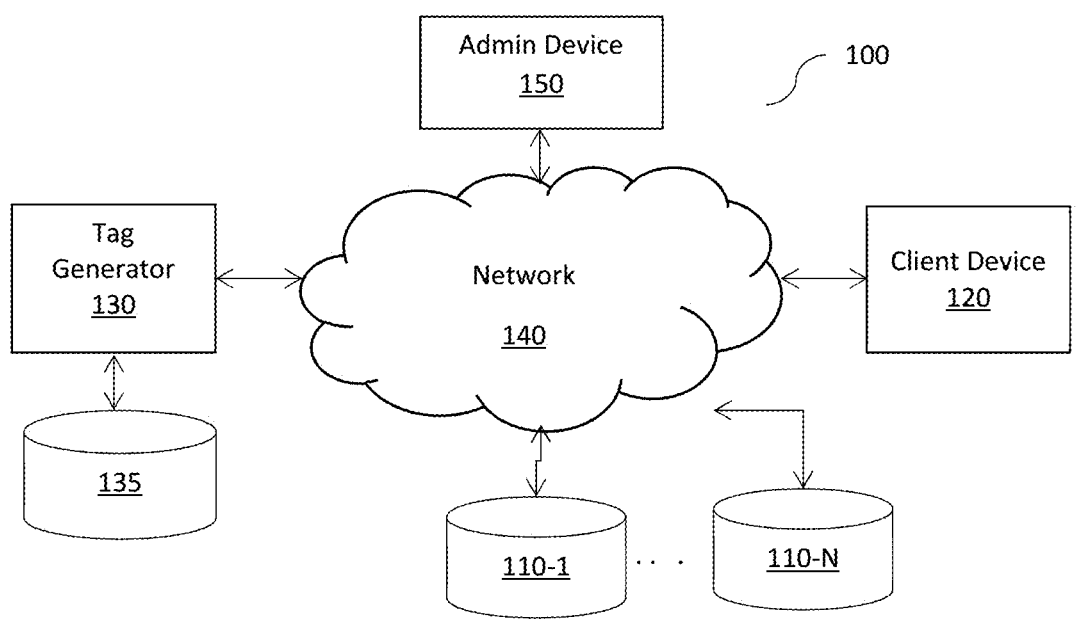
FIG. 1 is a network diagram utilized to describe various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include methods and systems for matching data sources properties, including, but not limited to, column names of tables in a database within such data sources. In an embodiment, the disclosed signature-based methods are natural language processing (NLP) specifically designed to allow accurate matching of such properties. The matching signature-based processes are performed using a knowledge repository.

In an example embodiment, the disclosed signature-based matching processes can be executed as a part of a process for tagging or cataloging metadata in database catalogs in data sources, and in particularly columns' names of tables in such data sources. The tagging is an operation for translating column names in databases into tags. A tag is a short sentence (several words) describing the column name, where the column name is, for example, constructed from various formats such as words concatenated with an underscore, abbreviated-words, and generically defined expressions. It should be noted that the signature-based matching process, disclosed herein, can be utilized in other applications, which require textual matching. Some example applications are discussed below.

FIG. 1 is an example network diagram 100 utilized to describe the various embodiments. The network diagram 100 includes a plurality of data sources 110-1 through 110-N (hereinafter referred to individually as a data source 110 and collectively as data sources 110 for simplicity), a client device 120, and a tag generator 130 using knowledge repository 135 communicatively connected via a network 140. The network 140 may be, but is not limited to, a wireless, cellular or wired network, a local area network (LAN), a wide area network (WAN), a metro area network (MAN), the Internet, the world wide web (WWW), similar networks, and any combination thereof. In certain implementations, an administrator (admin) device 150 is communicatively connected to the network 140. The administrator device 150 is typically utilized by, for example, a database administrator (DBA) to configure the data sources 110.

In an example embodiment, a data source 110 is a relational database organized based on a schema or relational model and uses SQL as the language for querying and maintaining the data. A database schema, or database catalog, is the skeleton structure that represents the logical view of the entire database in a data source. The database schema defines how the data is organized, how the relations among them are associated, and how the database formulates all the constraints to be applied on the data. The database 110 may be, for example, Oracle®, Sybase®, Microsoft SQL Server®, Access®, Ingres®, and the like. In an embodiment, various databases are logical entities residing in the same physical structure.

It should be noted that a data source 110 is not limited to a relational database. Each of the data sources 110 may include a data lake, a data warehouse, a streaming data, a dataset, a database and the like. Further, each data source 110 may be NoSQL type of database (such as, but not limited to, MongoDB).

By means of the client device 120, a user, e.g., a programmer can access any of the data sources 110. Such access may be any operation that a user is authorized to perform on any data sources 110. A client device 120 may be, but is not limited to, a personal computer, a laptop, a tablet computer, a smartphone, a wearable computing device, and the like.

In a typical arrangement, the data sources 110 are deployed in an organization (e.g., an enterprise) where each data source 110 may hold data related to a different department or to a different business function. For example, a data source 110-1 may be of an HR department and a data source 110-2 may be of a legal department. Each data source 110 may be configured with a different set of tables (i.e., database catalog; not shown). Tables in different data source 110 may be utilized to maintain duplicated columns configured with different column names. For example, the data sources 110-1 and 110-2 may be configured as shown in Tables 1 and 2.

In an example embodiment, the tag generator 130 is configured to match columns' names in the tables maintained in the data sources 110. The matching may be utilized to generate tags that would describe the data maintained by a respective column in the correct context. For example, the matching of a column name "MT_ID" in a table in a data source 110 would be matched "Money Transfer Identifier" in a respective table.

In an embodiment, the tag generator 130 utilizes a knowledge repository 135 for the signature-based matching process. In an embodiment, the knowledge repository 135 is pre-compiled and includes at least a seed table and data corpus. In certain embodiments, the knowledge repository 135 also includes discovery-assistance data (DAD).

The seed table 201 contains previously generated tags associated with their respective column names. The data corpus 402 includes a pair of columns (key and value) extracted from a collection of text information from public and/or private domains (e.g., articles, blogs, websites, or any other textual information). The DAD contains information about similar columns and the relationship among these columns. The DAD is generated based on the contents (values) of the columns.

The knowledge repository 135 may be updated over time as new tags are generated. An example block diagram of the tag generator 130 is provided below with reference to FIG. 6. Alternatively, or collectively, the tag generator 130 may be connected, for example, to an external storage device (not shown) for storing the generated tags and any user inputs.

According to the disclosed embodiments, the tag generator 130 is configured to perform NLP matching methods using the information in the knowledge repository 135. The NLP methods include signature matching of an input name to a key. The key is mapped to a value. The key and value pairs may reside in the seed table 201 and/or in the data corpus 402.

It should be noted that FIG. 1 is described hereinabove with respect to a single client device 120 and a single administrator device 150 merely for simplicity purposes and without limitation on the disclosed embodiments. Multiple administrator devices, client devices, data sources (of the same or different types), or a combination thereof, may be communicatively connected to the network 140 and the tag generator 130 without departing from the scope of the disclosure.

It should be further noted that the embodiments disclosed herein are not limited to the specific architecture illustrated in FIG. 1, and other architectures may be equally used without departing from the scope of the disclosed embodiments. Specifically, the tag generator 130 may reside in a cloud computing platform, a datacenter, and the like. Moreover, in an embodiment, there may be a plurality of tag generator systems operating as described hereinabove and configured to either has one as a standby, to share the load between them, or to split the functions between them. Further, in some embodiments, the tag generator 130 may be an internal component of a data source 110. An example implementation of the tag generator 130 is described below.

Figure 2:
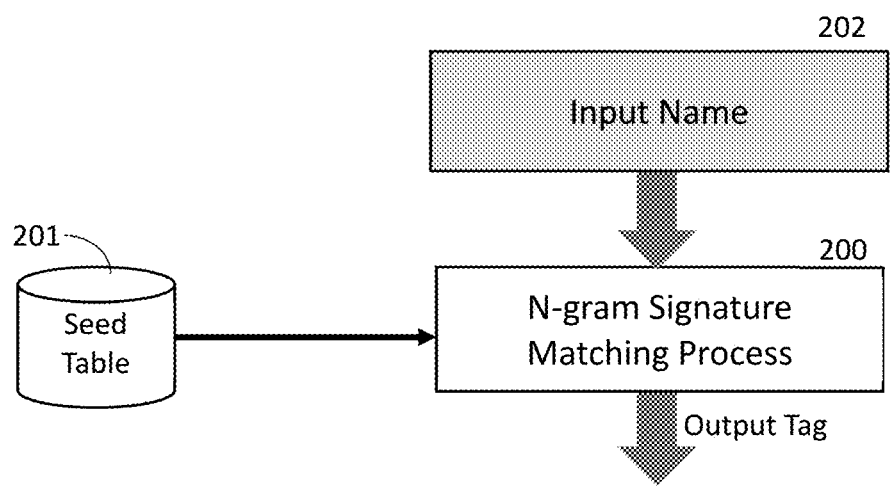
FIG. 2 is an example flow diagram utilized to describe an n-gram signature matching process according to an embodiment.

FIG. 2 is an example flow diagram utilized to describe the n-gram signature matching process 200. In an embodiment, the process 200 attempts to match an input name 202 to a key in the seed table 201, and based on this key a respective value is determined. The key may be the input name and the value may be a previously discovered or tagged description for the respective key. Following is an example seed table:

TABLE 3

| Key | Value |
|---|---|
| CUSTOMER_ID | Customer Identifier |
| USER_ID | User Identifier |
| CODE_GENDER | Gender Code |

In an embodiment, as will be discussed below the n-gram signature matching process 200 includes a dictionary search process and a hybrid search process using a phonetic conversion algorithm, n-gram decomposition, and their combinations to identify a matching key in the seed table 201.

The dictionary search process is performed against the seed table 201, where an identical key in the seed table 201 is selected, and a corresponding value that matches the identical key is returned as an output.

In one configuration, the dictionary search process may include an exact string matching of the input name 202 to the key. In another embodiment, the dictionary search process may include matching of hash values. To this end, a hash value is computed using a predefined hash function. The hash values computed over the input name 202, and the corresponding key should match.

The hybrid search process does not require an exact match to key entries in the seed table 201, but rather this search process is to identify key entries that typographically expression and/or phonetically sound similar to the input names.

In an example embodiment, the hybrid search process requires three fingerprints based on n-gram decomposition, phonetic conversion, and combination thereof.

A first fingerprint includes all decomposed n-grams of an input name 201 optionally the truncated, which are further saved in a storage of the tag generator 130. In an embodiment, n-grams are a set of consecutive letters, consecutive symbols, and a combination of consecutive letters and symbols at a different order from an input name. An order defines the number of letters (or symbols) in an n-gram. This n-gram decomposition includes splitting input (e.g., input name) into n-grams according to a specific order. An n-gram may be a letter (or a symbol) or consecutive letters (or symbols). For example, n-grams of the word "apple" with the length of one are "a", "e", "l", and "p" (i.e., the letters appear in the word). The highest ordered n-grams decomposed from "apple" would be five because the entire word involves five letters. As shown in Table 4, the word "apple" can be decomposed into 14 different ordered n-grams. The individual n-gram does not enable to identify originated word. For example, a word "pale" has the identical n-grams at first ordered ones. On the other hand, as a set of n-grams (i.e., the entire n-grams) identify the originated word "apple" clearly.

TABLE 4

| Order | N-grams |
| --- | --- |
| 1 | "a", "e", "l", "p" |
| 2 | "ap", "pp", "pl", "le" |
| 3 | "app", "ppl", "ple" |
| 4 | "appl", "pple" |
| 5 | "apple" |

A second fingerprint, a phonetic fingerprint, is generated using a phonetic conversion algorithm (or pronunciation schema) that indexes the words according to their pronunciation. In an example embodiment, the phonetic fingerprint is generated using a predetermined pronunciation schema, such as, but not limited to, a schema defined by the New York State Identification and Intelligence System (NYIIS). With this fingerprint, for example, input names with a hyphen (e.g., USER-ID), with plural (e.g., USER_IDS), and with an underscore (e.g., USER_ID) would be converted to an expression, "usarad". This identical phonetic expression is due to the fact that these input names are pronounced similarly.

The phonetic fingerprint is then decomposed to generate a third fingerprint. That is, the third fingerprint includes n-grams at different orders. The decomposition is performed as discussed above. For example, a phonetically converted input name "USARAD" would be decomposed into a set of n-grams shown in Table 5.

TABLE 5

| Order | N-grams |
| --- | --- |
| 1 | "a", "d", "r", "s", "u" |
| 2 | "us", "sa", "ar", "ra", "ad" |
| 3 | "usa", "sar", "ara", "rad" |
| 4 | "usar", "sara", "arad" |
| 5 | "usara", "sarad" |
| 6 | "usarad" |

The tag generator 130 is further configured to match some or all the generated fingerprints against the keys in the seed tables to find the closest matching key (i.e., the most similar key based on a similarity search). Each search result may be scored or weighted, and respective thereof the closest key value is selected. For example, if a third ordered n-gram is matching a key value, the score would be higher than matching only the first ordered n-gram(s). The second and fourth fingerprints can be compared and scored, for example, edit distance of two strings. In an embodiment, an optimized similarity searching algorithm may be utilized for the search. An example for such algorithm includes, but is not limited to, a MinHash LSH Forest search.

Figure 3:
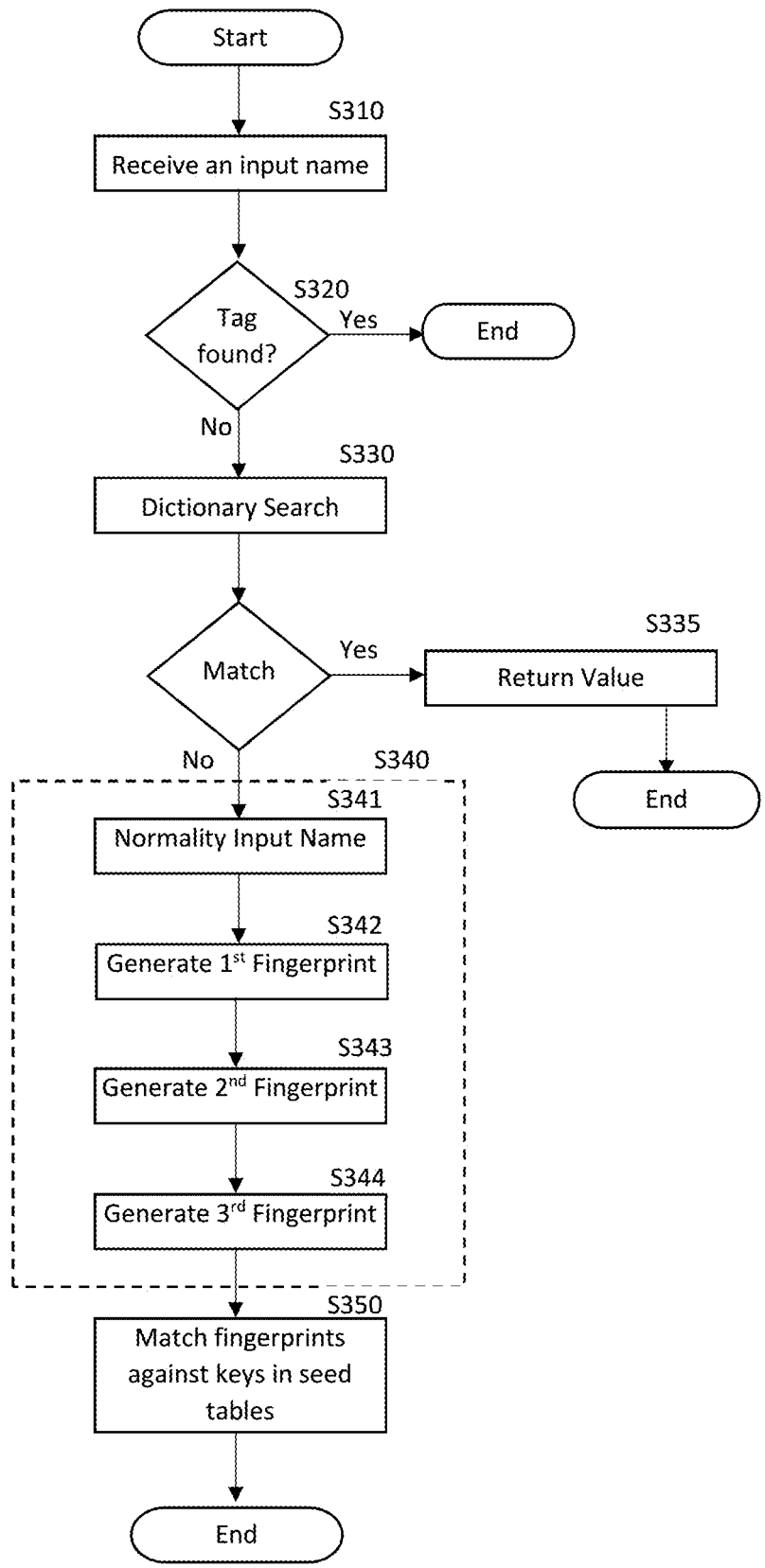
FIG. 3 is a flowchart of an n-gram signature matching process according to an embodiment.

FIG. 3 is an example flowchart 300 of an n-gram signature matching process according to an embodiment. At S310, an input name (e.g., a column name) to be matched is received. At S320, it is checked if there is an existing tag already generated for the input column name. The check is against a repository of previously generated tags. If so, execution ends; otherwise, execution proceeds to S330.

At S330, a dictionary search process is performed to find an exact match of the input name to a key in the seed value. If such a match is found, the respective value is returned (S335). If a match is not found, execution continues with S340 where an n-gram search is performed.

Optionally, at S341, the input name is truncated. An example truncation embodiment is discussed above. At S342, a first fingerprint is generated by decomposing the input name either in its truncated form or original form. The decomposition would result in a number of n-grams of different orders. An example n-gram decomposition embodiment is discussed above. At S343, a second (phonetic) fingerprint is generated for the input name using a predetermined pronunciation schema. At S344, a third fingerprint is generated by decomposing the phonetic fingerprint. The decomposition would result in a number of n-grams of different orders. Optionally, additional fingerprints are generated based on the first fingerprint, the second fingerprint, or both. An example embodiment for generating such fingerprints is discussed above.

At S350, at least one of the generated fingerprints are matched against the keys in the seed tables to find the closest matching key. As noted above, each search result may be scored or weighted, and respective thereof the closest key value is selected. In an embodiment, an optimized similarity searching algorithm may be utilized for the search. An example for such algorithm includes, but is not limited to, a MinHash LSH Forest search process.

In an example embodiment, by deploying stenography-based process, for the English language, an input name 201 can be truncated without losing word's typographical characteristics. The example embodiment, this truncation process may include: a) replacing a tailing "ing" with "g"; b) replacing a tailing "ed" with "d"; 3) keeping one of the consecutive letters; and 4) removing vowels. As an example, the normalization of the word "fitting" would take the following steps to generate a truncated expression "ftg" with: "fitting", "fittg", "fitg", and "ftg", respectively.

The truncated word can be decomposed to n-grams at different orders as described above. For example, the truncated word "ftg" originated from "fitting" may be decomposed to six n-grams shown in Table 6. In contrast, a word "fitting" may be decomposed to 26 n-grams. Although the number of decomposed n-grams is reduced significantly, the set of n-grams from truncated word preserves the originated word's typographical characterizes. This reduction of n-grams would reduce the required amount of data needs to be stored and would be further saved in the storage of the tag generator 130.

TABLE 6

| Order | N-grams |
| --- | --- |
| 1 | "f", "g", "t" |
| 2 | "ft", "tg" |
| 3 | "ftg" |

It should be noted that the three fingerprints, discussed above, are based on: n-grams, phonetic; and combination thereof. On the other hand, by utilizing word-standardization process, other fingerprints can be generated, for example, based on n-grams from words, truncated words, and/or lexical order of n-grams. In a specific embodiment, a fourth fingerprint can be generated based on each of the first and third of fingerprints. In this embodiment, the n-grams composing a fingerprint are first sorted then concatenated. For example, n-grams up to a second order of a word "apple" are: "a", "e", "l", "p", "ap", "pp", "pl", and "le" (see Table 4). The concatenated fingerprint with sorted letters lexically would be: "aelpappplle", where "aelp" is composed of the first ordered n-grams and "apppplle" is composed of the second ordered n-grams.

It should be appreciated that the n-gram signature matching process can be used for other languages not limited to English. As described above, this n-gram signature matching process is based on consecutive letters, consecutive symbols, and combination of consecutive letters and symbols, and their pronunciation schema. The same process can be applied for, not limited to, French, German, and Spanish.

In a second embodiment, a probabilistic signature matching process is performed against the data corpus 402, where optimal text segments are determined, closest keys of the segments in the corpus are selected, and corresponding values that match the closest keys are returned as an output. As will be discussed below, this matching method may involve probabilistic word splitting (PWS) algorithm with multiple fingerprints as described above.

In an embodiment, a data corpus 402 includes a collection of words and/or abbreviations from a broad range of data resources in a specific domain area. In this embodiment, a frequency of the words and/or abbreviations appearance in the data corpus 402 can be calculated. This frequency denotes popularity of the words and/or abbreviations in the specific domain area. A specific word's frequency may differ in different domain areas. For example, the word "metro" may have high-frequency value in the public transportation domain area. On the other hand, the corresponding frequency may not be high in other domain areas, for example, the stock market domain area.

In an embodiment, the entries in the data corpus 402 can be used as keys, and the corresponding description (i.e., a short sentence describing the key) can be used as values. By associating descriptions, a common abbreviation in a specific domain area can be inflated appropriately. For example, an abbreviation "MT" may be common in finance domain area, and the corresponding frequency calculated using a data corpus 402 may be high because "MT" may stand for "Money Transaction" in this area. On the other hand, this abbreviation may be used differently in other domain areas. For example, "MT" may stand for "Manual Transmission" in the automotive domain area. By inflating abbreviations appropriately, readability of output tag increases and quality of the resulting database catalog increases as well.

In an embodiment, a PWS algorithm is utilized to segment the input name using dynamic programming. In this embodiment, the PWS algorithm divides the input name into text segments likely to have some meaning. For example, a segment that can be found in an English dictionary is considered to have meaning. In an example embodiment, a text segment considers to likely have a meaning is a key is found in the data corpus 402. Once an appropriate key is found in the data corpus, the search focuses on the rest of the segments (i.e., remaining sub-segments) by deploying dynamic programming.

Figure 4:
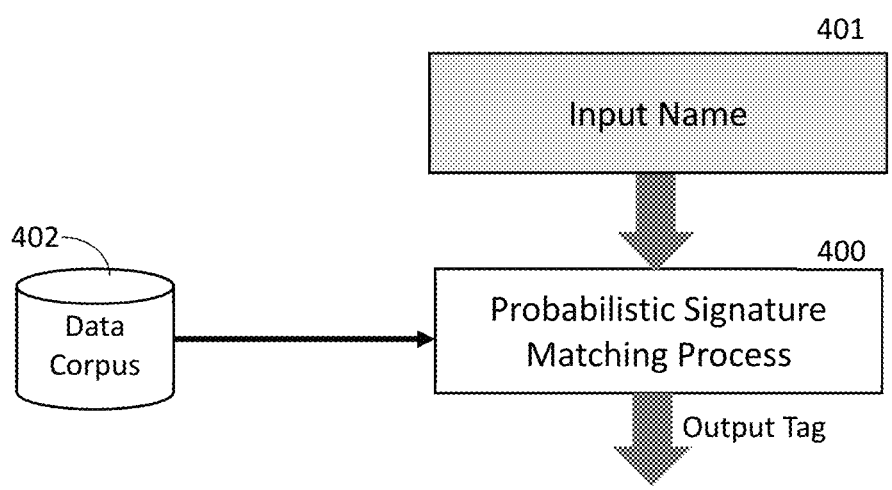
FIG. 4 is an example flow diagram illustrating the probabilistic signature matching process according to an embodiment.

FIG. 4 is an example flow diagram illustrating the probabilistic signature matching process 400 according to an embodiment. An input name 401 (e.g., a column name) is divided into a number of text segments (or n-grams) and searching, using the segments, for the closest keys in the data corpus 402. The process may be performed by the tag generator 130.

In an embodiment, each segment is matched independently against the keys in the data corpus 402 and the probability of each match is determined. The probability is determined based on the appearance of the segment in the data corpus 402. For example, the determined probability may be a function of a frequency of the segment appearance in the corpus 402, the count of the segment in the corpus 402, and the like. The determined probability may also be a function of the length of the segment. As the data corpus 402 is trained on a broad range of data sources in a specific data domain, the appropriate segment probabilities for a user-specific domain can be accurately determined. It should be noted that the data corpus 402 can be trained against data sources in many domains to cover cases of general requirements.

As an example, the input name 201 "custid" can be divided into the segments "cust" and "id". As another example, the same input name "custid" can be divided into the segments: "cu", "st" and "id", respectively. The former example can be matched to "Customer Identifier", while the latter example can be matched to "Copper Street Identifier". The probability that the "Customer Identifier" is an accurate term is higher than "Copper Street Identifier" and, therefore, "Customer Identifier" is selected as the output for the input.

Figure 5:
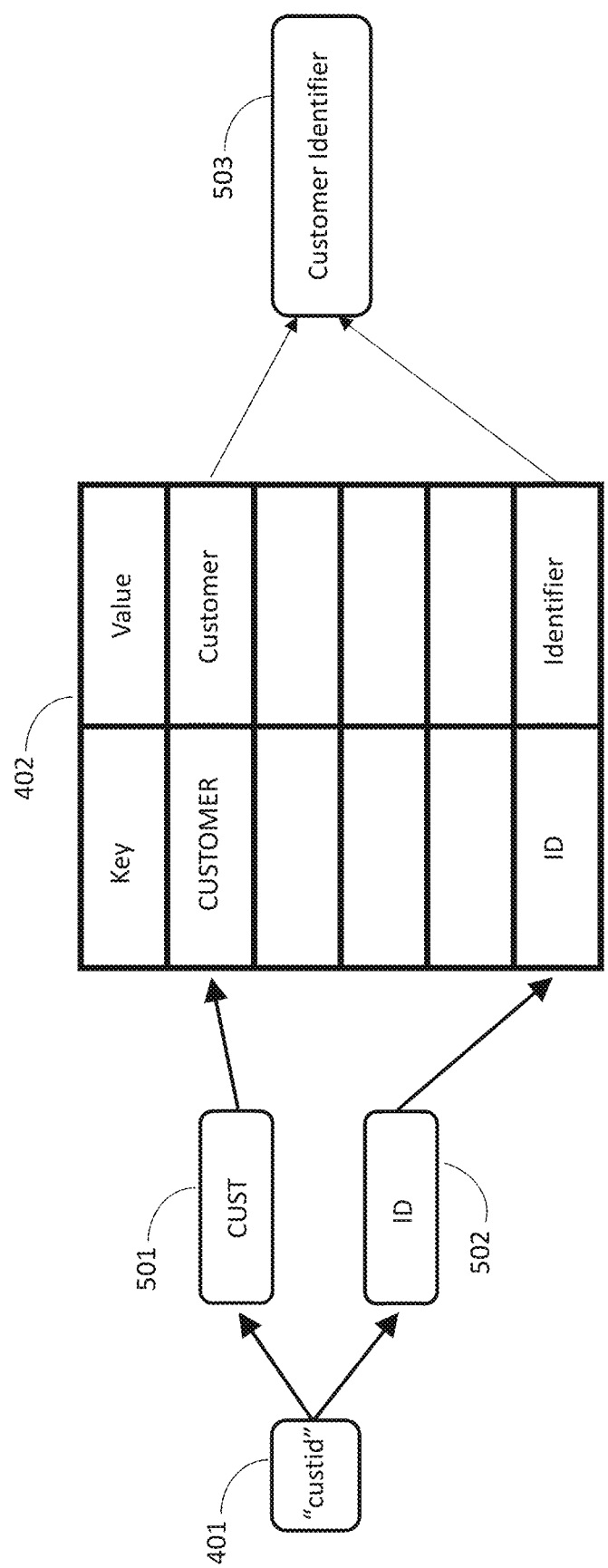
FIG. 5 is a diagram demonstrating a search of the data corpus for keys matching input column names according to an embodiment.

Referring now to FIG. 5, an input name (501) "custid" is split into the segment "cust" and "id" (labeled 501 and 502, respectively) as described above. The search against the corpus 402 identifies two matching keys "customer" and "id". In this example, and output tag 503 may be "Customer Identifier". The search of the n-grams against the data corpus 502 can be performed using the signature matching method discussed above.

Another example is an input name with concatenated word and abbreviations, "accholdernamealt". This concatenated string can be splited to "acc", "holder", "name", and "alt". By associate inflated expressions, "acc" with "account", and "alt" with "alternative", the input name can be inflated as "account holder name alternative". Further, using the n-gram signature matching process, the output tag would be "Alternative Account Holder Name" which has high readability.

Figure 6:
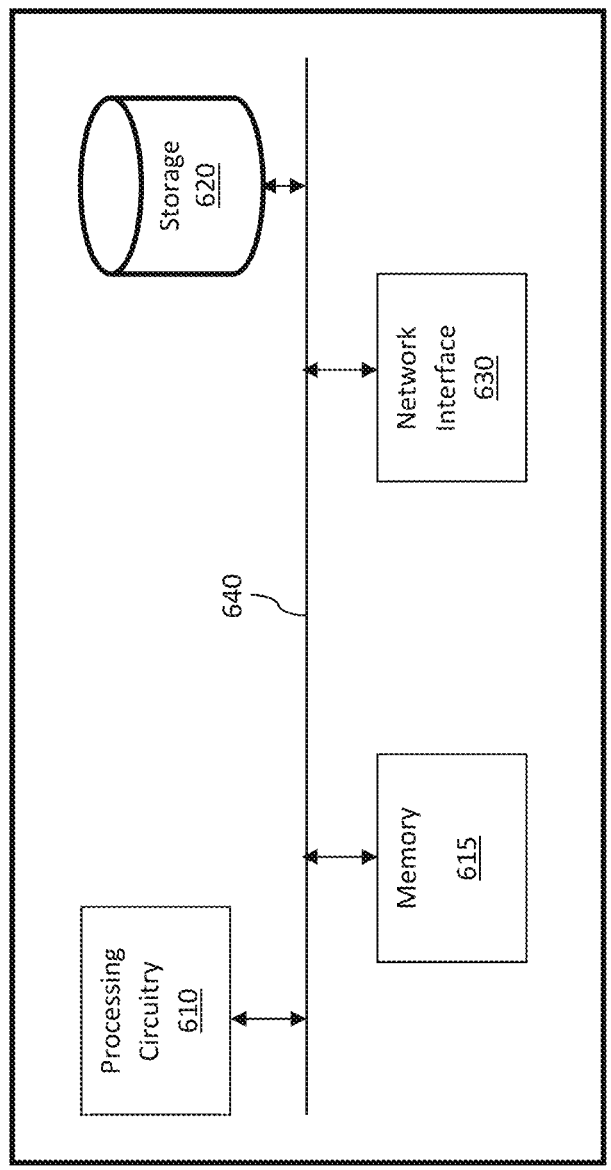
FIG. 6 is a block diagram of a tag generator according to an embodiment.

FIG. 6 shows an example block diagram of the tag generator 130 implemented according to an embodiment. The tag generator 130 includes a processing circuitry 610 coupled to a memory 615, a storage 620, and a network interface 630. In an embodiment, the components of the tag generator 130 may be communicatively connected via a bus 640.

The processing circuitry 610 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 615 may be volatile (e.g., RAM, etc.), non-volatile (e.g., ROM, flash memory, etc.), or a combination thereof. In one configuration, computer readable instructions to implement one or more embodiments disclosed herein may be stored in the storage 620.

In another embodiment, the memory 615 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 610 to perform the various processes described herein. Specifically, the instructions, when executed, cause the processing circuitry 610 to perform the process search-based matching and tagging columns names, as discussed hereinabove.

The storage 610 may be magnetic storage, optical storage, and the like, and may be realized, for example, as flash memory or other memory technology, CD-ROM, Digital Versatile Disks (DVDs), or any other medium which can be used to store the desired information.

The network interface 640 allows the tag generator 130 to communicate with the client device (FIG. 1, 120), the knowledge repository (FIG. 1, 135), and the various data sources (FIG. 1, 110).

It should be understood that the embodiments described herein are not limited to the specific architecture illustrated in FIG. 6, and other architectures may be equally used without departing from the scope of the disclosed embodiments.

It should be appreciated that the embodiments disclosed herein are not limited to tagging of column names of data sources, datasets, databases and other applications can be realized using the signature matching techniques. For example, the disclosed embodiments can be utilized to identify newly generated terms and to search matching terms in foreign languages (e.g., non-English languages).

The disclosed signature-based matching methods are based on how input names (newly generate terms) are written and pronounced. As such, the disclosed methods generate a significantly different fingerprints to search accurate matching.

As an example, a newly generated term, "emoticon" (Emotion Icon) is significantly different than its originated words (Emotion Icon). Using the disclosed signature-based matching methods the term "emotion" is mapped to "emoticon with emotion" and "emotion with icon" due to the similarities in terms of spelling.

Another example demonstrating the ability to identify terms based on their pronunciation would be the noun, orange. The word "orange" is pronounced as "ɔːrɪndʒ" in America, and "ɒrɪndʒ" in the UK. Furthermore, "orange" is pronounced as "ɔʀɑ̃ʒ" in French. The disclosed signature-based matching would generate different fingerprints based on the pronunciations of the same word.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computer implemented method for cataloging database metadata using a probabilistic signature matching process, comprising:
   receiving an input name to be matched to keys in a data corpus;
   dividing the received input name into a plurality of text segments;
   identifying a set of matching keys by matching each of the plurality of text segments against keys in the data corpus, wherein the identifying is based on developing for each text segment at least one of a plurality of n-grams, at least two of the plurality of n-grams having different orders and being developed from letters of the received input name and at least two of the plurality of n-grams having different orders and being developed from letters of a phonetic expression of the received input name based on a pronunciation schema;
   analyzing the set of matching keys to construct a tag; and
   cataloging the database metadata with the constructed tag.

2. The computer implemented method of claim 1, wherein dividing the received input name further comprises:
   dividing the input name into strings;
   determining for each string whether a respective string is found in the data corpus; and
   determining each string found in the data corpus as a text segment.

3. The computer implemented method of claim 2, further comprising:
   deploying dynamic programming to determine whether the respective string is found in the data corpus.

4. The computer implemented method of claim 1, wherein matching of each of the plurality of text segments against keys in the data corpus further comprises:
   determining, for each of the plurality of text segments, a probability for a matching key, wherein the determination is based on the contents of the data corpus; and
   selecting a one of the plurality of text segments with the highest probability as the matching key.

5. The computer implemented method of claim 4, wherein the probability is a function of at least one of: a frequency of appearance for each of the plurality of text segments in the data corpus and a count of each of the plurality of text segments in the corpus.

6. The computer implemented method of claim 1, wherein the data corpus includes pairs of keys and values related to input names and corresponding respective tags.

7. The computer implemented method of claim 6, wherein the data corpus is trained on a broad range of data sources in a specific data domain.

8. The computer implemented method of claim 1, wherein the tag is a description of the input name.

9. The computer implemented method of claim 1, wherein the received input name is a column name of one or more databases across multiple data sources.

10. A non-transitory computer readable medium having stored thereon instructions for causing a processing circuitry to execute the method of claim 1.

11. A system for cataloging database metadata using a probabilistic signature matching process, comprising:
   a processing circuitry; and
   a memory, the memory containing instructions that, when executed by the processing circuitry, configure the system to:
   receive an input name to be matched to keys in a data corpus;
   divide the received input name into a plurality of text segments;
   identify a set of matching keys by matching each of the plurality text segments against keys in the data corpus, wherein the identifying is based on developing for each text segment at least one of a plurality of n-grams, at least two of the plurality of n-grams having different orders and being developed from letters of the received input name and at least two of the plurality of n-grams having different orders and being developed from letters of a phonetic expression of the received input name based on a pronunciation schema;
   analyze the set of matching keys to construct a tag; and
   catalog the database metadata with the constructed tag.

12. The system of claim 11, wherein the system is further configured to:
   divide the input name into strings;
   determine for each string whether a respective string is found in the data corpus; and
   determine each string found in the data corpus as a text segment.

13. The system of claim 12, wherein the system is further configured to:
   deploy dynamic programming to determine whether the respective string is found in the data corpus.

14. The system of claim 11, wherein the system is further configured to:
   determine, for each of the plurality of text segments, a probability for a matching key, wherein the determination is based on the contents of the data corpus; and
   select a one of the plurality of text segments with the highest probability as the matching key.

15. The system of claim 14, wherein the probability is a function of at least one of: a frequency of appearance for each of the plurality of text segments in the data corpus and a count of each of the plurality of text segments in the corpus.

16. The system of claim 11, wherein the data corpus includes pairs of keys and values related to input names and corresponding respective tags.

17. The system of claim 16, wherein the data corpus is trained on a broad range of data sources in a specific data domain.

18. The computer implemented method of claim 1, wherein the tag is a description of the input name.

19. The system of claim 11, wherein the received input name is a column name of one or more databases across multiple data sources.

* * * * *